United States Patent
Glahn et al.

(10) Patent No.: US 8,167,545 B2
(45) Date of Patent: May 1, 2012

(54) SELF-BALANCING FACE SEALS AND GAS TURBINE ENGINE SYSTEMS INVOLVING SUCH SEALS

(75) Inventors: Jorn A. Glahn, Manchester, CT (US); Peter M. Munsell, Granby, CT (US)

(73) Assignee: United Technologies Corp., Hartford, CT (US)

( * ) Notice: Subject to any disclaimer, the term of this patent is extended or adjusted under 35 U.S.C. 154(b) by 995 days.

(21) Appl. No.: 12/038,127

(22) Filed: Feb. 27, 2008

(65) Prior Publication Data
US 2009/0212501 A1    Aug. 27, 2009

(51) Int. Cl.
*F04D 29/08* (2006.01)
*F04D 29/10* (2006.01)

(52) U.S. Cl. .................... 415/171.1; 415/230

(58) Field of Classification Search ............ 415/104, 415/105, 106, 170.1, 171.1, 230, 231; 277/361, 277/362, 387, 388, 413, 306, 32, 368
See application file for complete search history.

(56) References Cited

U.S. PATENT DOCUMENTS

| | | | |
|---|---|---|---|
| 3,743,303 A * | 7/1973 | Pope | 277/422 |
| 4,477,088 A | 10/1984 | Picard | |
| 4,687,346 A | 8/1987 | Suciu | |
| 4,916,892 A * | 4/1990 | Pope | 60/772 |
| 5,137,284 A | 8/1992 | Holder | |
| 5,174,584 A * | 12/1992 | Lahrman | 277/400 |
| 5,180,173 A | 1/1993 | Kimura | |
| 5,205,652 A | 4/1993 | Chapman | |
| 5,284,347 A | 2/1994 | Pope | |
| 6,341,782 B1 | 1/2002 | Etsion | |
| 6,676,369 B2 | 1/2004 | Brauer | |
| 6,758,477 B2 | 7/2004 | Brauer et al. | |
| 6,881,027 B2 | 4/2005 | Klaass et al. | |
| 2004/0207158 A1 | 10/2004 | Agrawal et al. | |
| 2007/0003407 A1 * | 1/2007 | Turner et al. | 415/115 |
| 2007/0007730 A1 | 1/2007 | Garrison et al. | |
| 2007/0085278 A1 | 4/2007 | Davis et al. | |
| 2007/0149031 A1 | 6/2007 | Martin et al. | |
| 2007/0222160 A1 * | 9/2007 | Roberts-Haritonov et al. | 277/387 |
| 2008/0310953 A1 * | 12/2008 | Garrison | 415/173.2 |
| 2009/0051119 A1 * | 2/2009 | Glahn et al. | 277/400 |
| 2009/0051120 A1 * | 2/2009 | Munsell et al. | 277/400 |

FOREIGN PATENT DOCUMENTS

EP    0340883    11/1989

OTHER PUBLICATIONS

EPO International Search Report and Written Opinion, Jul. 21, 2009, 5 pages.

* cited by examiner

*Primary Examiner* — Edward Look
*Assistant Examiner* — Jason Davis
(74) *Attorney, Agent, or Firm* — Kinny & Lange, P.A.

(57) ABSTRACT

Self-balancing face seals and gas turbine engine systems involving such seals are provided. In this regard, a representative self-balancing face seal assembly includes: a rotatable seal runner having a first seal runner face and an opposing second seal runner face; a first face seal operative to form a first seal with the first seal runner face, the first face seal being one of a hydrostatic seal and a hydrodynamic seal; and a second face seal operative to form a second seal with the second seal runner face, the first face seal being one of a hydrostatic seal and a hydrodynamic seal.

18 Claims, 4 Drawing Sheets

SELF-BALANCING FACE SEALS AND GAS TURBINE ENGINE SYSTEMS INVOLVING SUCH SEALS

BACKGROUND

1. Technical Field

The disclosure generally relates to gas turbine engines.

2. Description of the Related Art

A gas turbine engine typically maintains pressure differentials between various components during operation. These pressure differentials are commonly maintained by various configurations of seals. In this regard, labyrinth seals oftentimes are used in gas turbine engines. As is known, labyrinth seals tend to deteriorate over time. By way of example, a labyrinth seal can deteriorate due to rub interactions from thermal and mechanical growths, assembly tolerances, engine loads and maneuver deflections. Unfortunately, such deterioration can cause increased flow consumption resulting in increased parasitic losses and thermodynamic cycle loss.

SUMMARY

Self-balancing face seals and gas turbine engine systems involving such seals are provided. In this regard, an exemplary embodiment of a self-balancing face seal assembly comprises: a rotatable seal runner having a first seal runner face and an opposing second seal runner face; a first face seal operative to form a first seal with the first seal runner face, the first face seal being one of a hydrostatic seal and a hydrodynamic seal; and a second face seal operative to form a second seal with the second seal runner face, the second face seal being one of a hydrostatic seal and a hydrodynamic seal.

An exemplary embodiment of a turbine assembly for a gas turbine engine comprises: a turbine having rotatable blades and a self-balancing face seal assembly; the self-balancing face seal assembly having a seal runner, a first face seal and a second face seal; the seal runner having a first seal runner face and a second seal runner face; the first face seal being operative to form a first seal with the first seal runner face, the first face seal being one of a hydrostatic seal and a hydrodynamic seal; and the second face seal being operative to form a second seal with the second seal runner face, the second face seal being one of a hydrostatic seal and a hydrodynamic seal.

An exemplary embodiment of a gas turbine engine comprises: a compressor; a shaft interconnected with the compressor; and a turbine operative to drive the shaft, the turbine having a self-balancing face seal assembly having a seal runner, a first face seal and a second face seal; the seal runner having a first seal runner face and a second seal runner face; the first face seal being operative to form a first seal with the first seal runner face, the first face seal being one of a hydrostatic seal and a hydrodynamic seal; and the second face seal being operative to form a second seal with the second seal runner face, the second face seal being one of a hydrostatic seal and a hydrodynamic seal.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Self-balancing face seals and gas turbine engine systems involving such seals are provided, several exemplary embodiments of which will be described in detail. In this regard, self-balancing face seals use hydrostatic and/or hydrodynamic forces to position adjustable seal faces adjacent to the opposing sides of a seal runner. In some embodiments, a self-balancing face seal can be used at various locations of a gas turbine engine, for example, such as in association with a low-pressure turbine.

Figure 1:
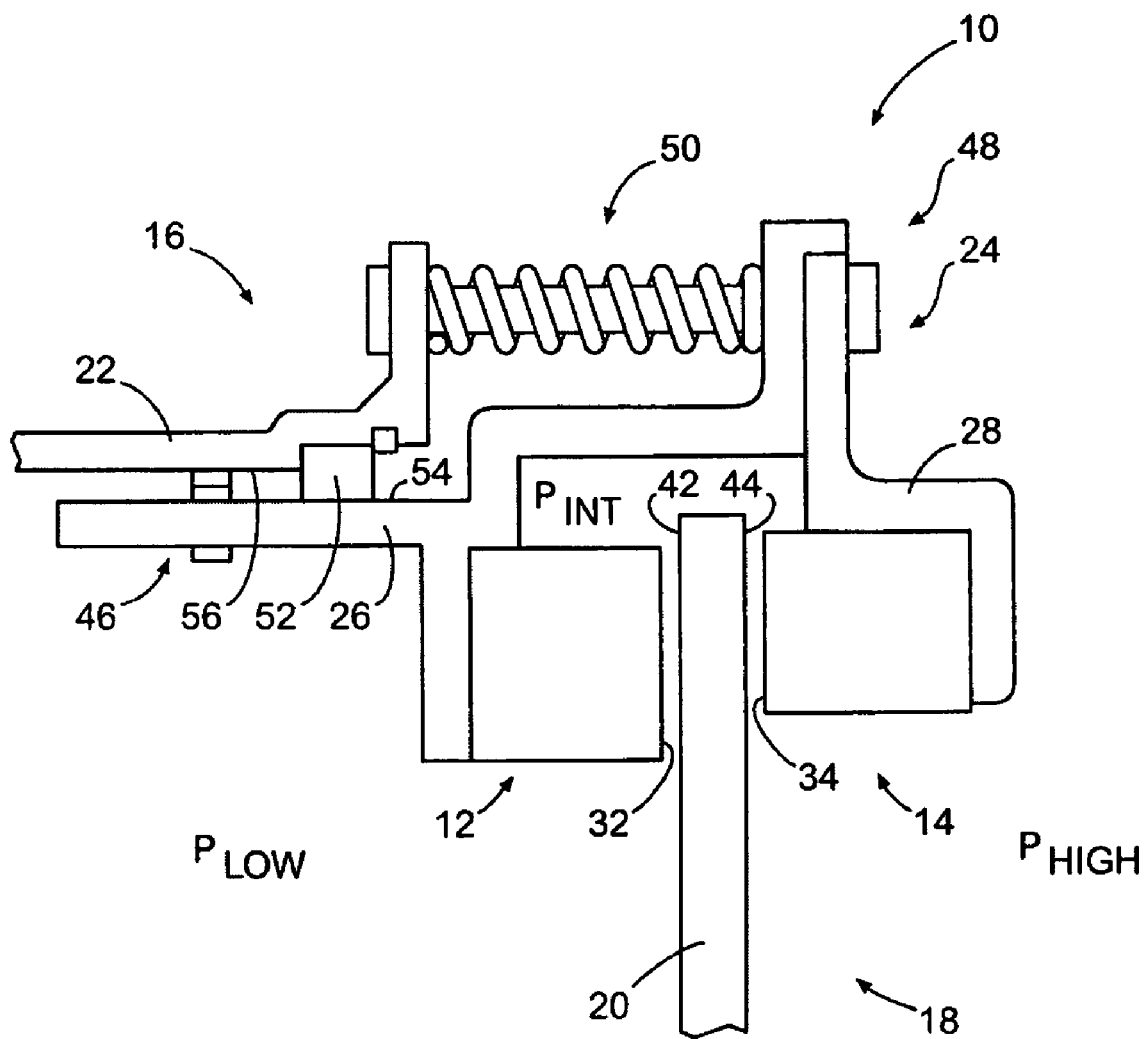
FIG. 1 is a schematic diagram depicting an exemplary embodiment of a self-balancing face seal.

An exemplary embodiment of a self-balancing face seal assembly is depicted schematically in FIG. 1. As shown in FIG. 1, face seal assembly 10 incorporates opposing face seals 12 and 14 that are formed by portions of a stationary stator assembly 16 and a portion of a rotating rotor assembly 18. Specifically, rotor assembly 18 provides a seal runner 20.

Stator assembly 16 includes an arm 22 that facilitates attachment, removal and/or placement of the face seals. A carrier 24 of the stator assembly includes a carrier member 26 (which carries face seal 12) and a carrier member 28 (which carries face seal 14). Carrier 24 accommodates differential thermal growth of the rotor assembly and the stator assembly. Notably, each of the face seals is annular in shape.

Each of the face seals 12, 14 includes a seal face (i.e., a seal-forming surface). Specifically, face seal 12 includes a seal face 32 and face seal 14 includes a seal face 34. Carrier member 26 is axially translatable so that seal face 32 can move, with carrier member 26, away from or toward face 42 of seal runner 20. Similarly, carrier member 28 is axially translatable so that seal face 34 can move, with carrier member 28, away from or toward face 44 of seal runner 20.

In this embodiment, an anti-rotation feature 46 is provided to prevent circumferential displacement of carrier member 26 with respect to the arm 22 and to assist in aligning the carrier member 26 to facilitate axial translation. An anti-rotation feature 48 is provided to prevent circumferential displacement of carrier member 28 with respect to carrier member 26.

A biasing member 50, which is provided as a spring in this embodiment, biases the carrier members 26, 28 together to establish a defined clearance between the seal faces 32, 34. In this regard, the defined clearance can be selected to maintain a desired pressure differential between a high-pressure side ($P_{HIGH}$) and a low-pressure side ($P_{LOW}$) of the seal assembly. Notably, multiple biasing members may be spaced about the carrier. Additionally, a secondary seal 52 (e.g., a piston ring) is captured between opposing surfaces 54, 56 of the arm 22 and carrier member 26, respectively, to control gas leakage between the arm and the carrier.

In operation, interaction between seal face 32 and seal runner face 42 results in pneumatic forces urging seal face 32 away from seal runner face 42. Simultaneously, however, interaction between seal face 34 and seal runner face 44 results in other pneumatic forces urging seal face 34 away from seal runner face 44. These competing pneumatic forces, when balanced, tend to cause centering of the seal runner between the opposing seal faces 42, 44, thereby establishing the desired sealing between the low-pressure side ($P_{LOW}$) and the high-pressure side ($P_{HIGH}$) of the seal assembly 10.

Notably, either or both of face seals 12 and 14 can be hydrostatic seals or hydrodynamic seals. In this regard, a hydrostatic seal is a seal that uses balanced static pressure forces as opening and closing forces to maintain a desired separation between a seal face and a corresponding seal runner. A hydrodynamic seal is a seal that uses balanced dynamic pressure forces as opening and closing forces to maintain a desired separation between a seal face and a corresponding seal runner. In a hydrodynamic seal, one or both of the seal face and corresponding seal runner can include surface features for generating the dynamic pressure forces when the seal runner rotates relative to the seal face. Typically, both face seals of a particular seal assembly are of the same type.

During normal operating conditions, the seal faces 32, 34 and the seal runner faces 42, 44 should not contact each other. In this regard, a material containing carbon can be used as a seal face material. It should be noted, however, that carbon can fracture or otherwise be damaged due to unintended contact (e.g., excessively forceful contact) between the seal face and the seal runner as may be caused by severe pressure fluctuations and/or vibrations, for example. It should also be noted that carbon may be susceptible to deterioration at higher temperatures. Therefore, carbon should be used in locations where predicted temperatures are not excessive such as in the low-pressure turbine. By way of example, use of such a material may not be appropriate, in some embodiments, in a high-pressure turbine.

Figure 2:
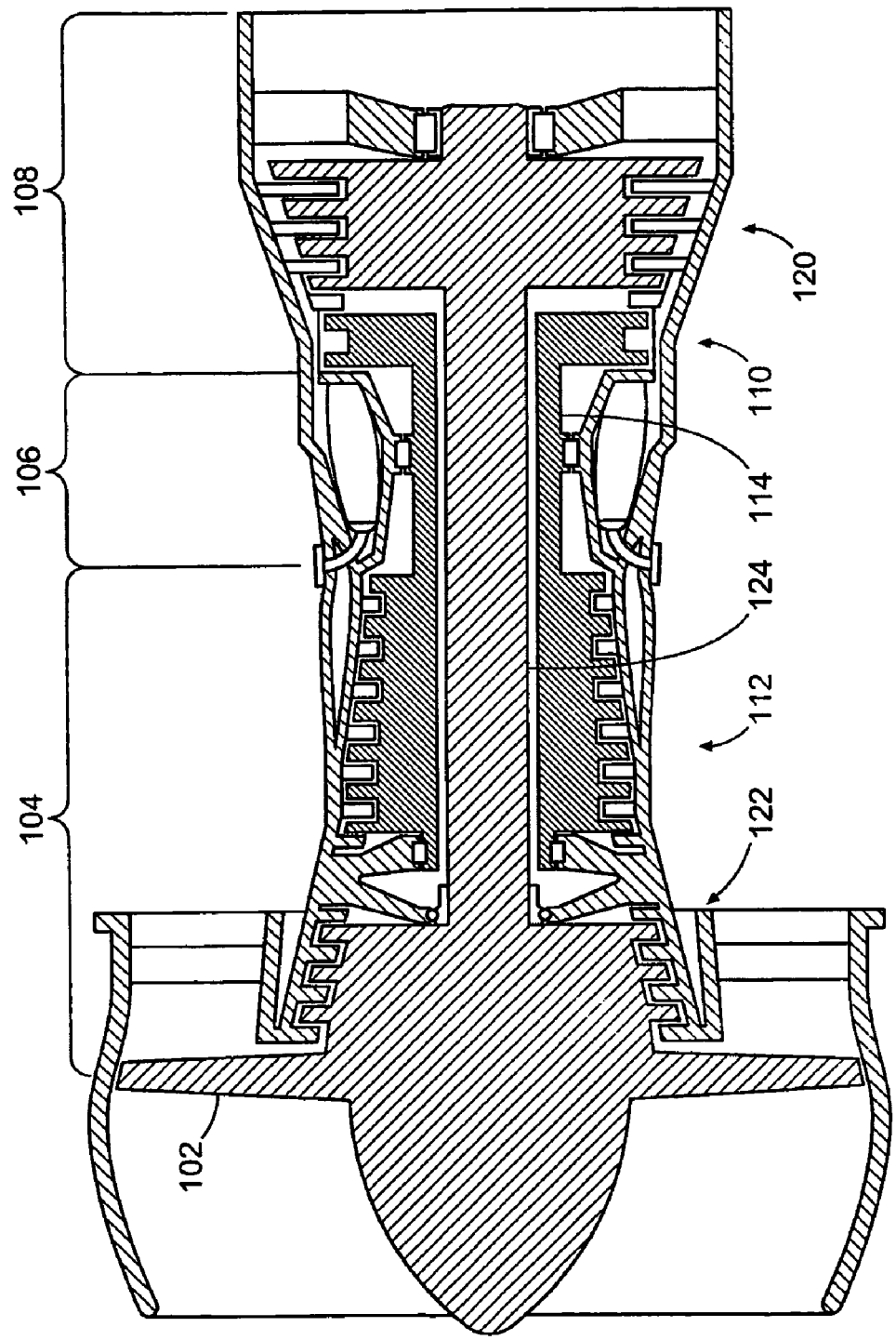
FIG. 2 is a schematic diagram depicting an exemplary embodiment of a gas turbine engine.

FIG. 2 is a schematic diagram depicting an exemplary embodiment of a gas turbine engine that incorporates at least one self-balancing face seal. As shown in FIG. 2, engine 100 is configured as a turbofan gas turbine engine that incorporates a fan 102, a compressor section 104, a combustion section 106 and a turbine section 108. Although the embodiment of FIG. 2 is configured as a turbofan, there is no intention to limit the concepts described herein to use with turbofans. That is, self-balancing face seals can be used in various other configurations of gas turbine engines, as well as in other systems in which maintaining a pressure differential between rotating and non-rotating components is desired.

In the embodiment of FIG. 2, engine 100 is a dual spool engine that includes a high-pressure turbine 110 interconnected with a high-pressure compressor 112 via a shaft 114, and a low-pressure turbine 120 interconnected with a low-pressure compressor 122 via a shaft 124.

Figure 3:
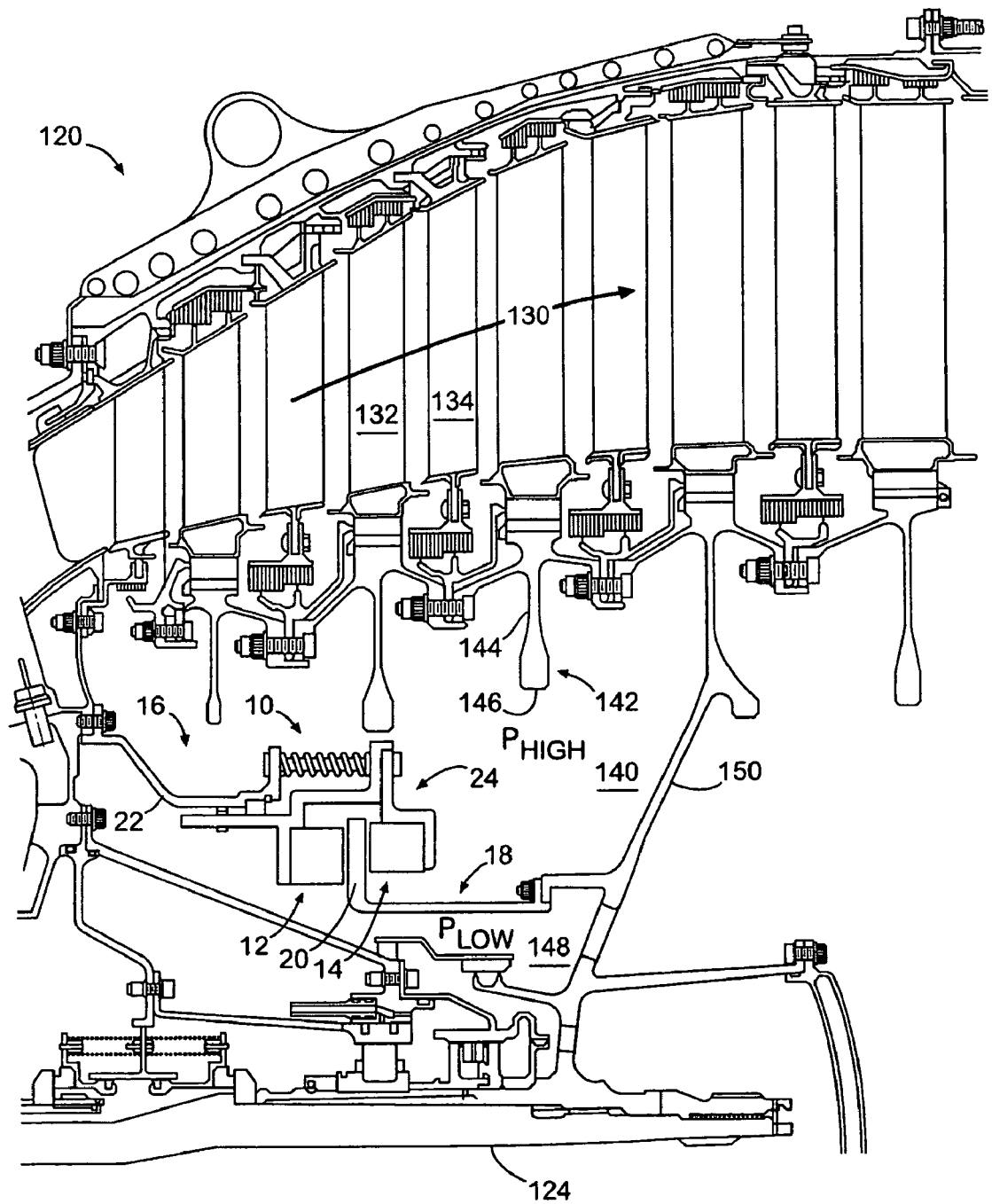
FIG. 3 is a schematic diagram depicting a portion of the low-pressure turbine of FIG. 2, showing detail of the embodiment of the self-balancing face seal of FIG. 1 installed therein.

As shown in FIG. 3, low-pressure turbine 120 defines a primary gas flow path 130 along which multiple rotating blades (e.g., blade 132) and stationary vanes (e.g., vane 134) are located. In this embodiment, the blades are mounted to turbine disks, the respective webs and bores of which extend into a high-pressure cavity 140. For instance, disk 142 includes a web 144 and a bore 146, each of which extends into cavity 140.

A relatively lower-pressure cavity 148 is oriented between high-pressure cavity 140 and turbine hub 150, with a self-balancing face seal assembly 10 (described in detail before with respect to FIG. 1) being provided to maintain a pressure differential between the high-pressure cavity and the lower-pressure cavity. It should also be noted that although this embodiment is described as incorporating a self-balancing face seal in association with a low-pressure turbine, such seals are not limited to use with low-pressure turbines when used in gas turbine engines.

In the implementation of FIG. 3, the rotor assembly 18 (which includes the seal runner 20) is provided by a removable bracket that is mounted to the low-pressure turbine hub 150. The stator assembly 16 (which provides arm 22 and carrier 24) is provided by a removable bracket that is mounted to a stationary portion of the engine. By providing seal assembly 10 as a removable assembly, the location of which can be adjusted axially and/or radially, thrust balance trimming of engine 100 can be at least partially accommodated by altering the position of the seal assembly to adjust the volume of cavities 140 and 148.

Figure 4:
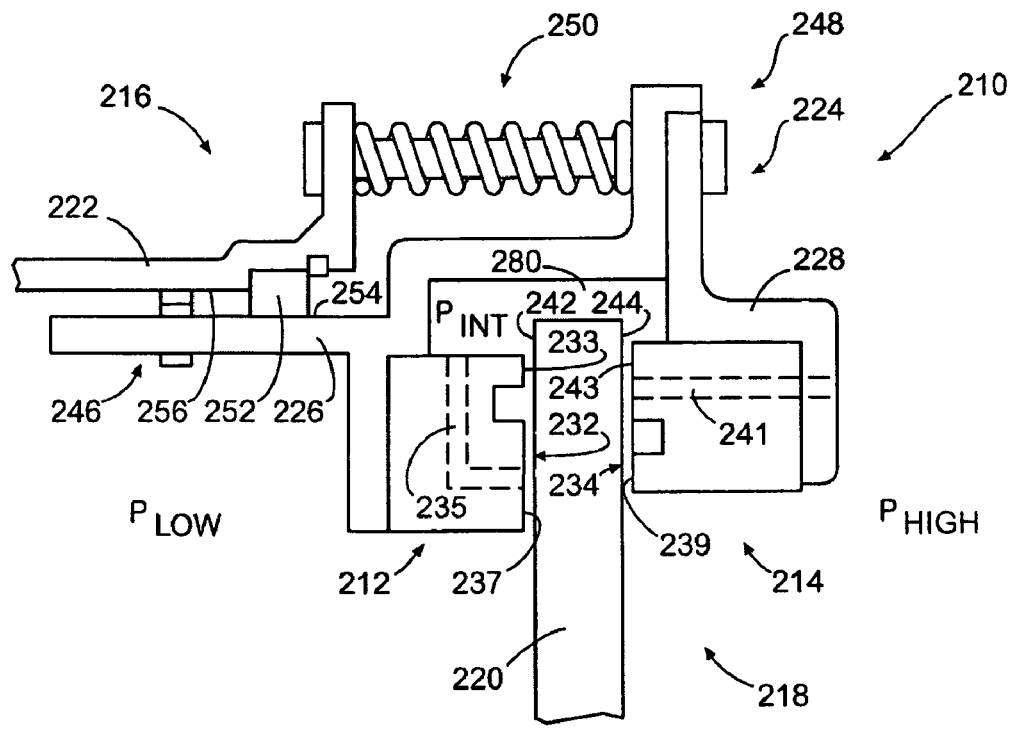
FIG. 4 is a schematic diagram depicting an exemplary embodiment of a self-balancing face seal using hydrostatic balancing forces.

Another exemplary embodiment of a self-balancing face seal assembly is depicted schematically in FIG. 4. As shown in FIG. 4, face seal assembly 210 incorporates opposing hydrostatic face seals 212 and 214 that are formed by portions of a stationary stator assembly 216 and a portion of a rotating rotor assembly 218. Specifically, rotor assembly 218 provides a seal runner 220.

Stator assembly 216 includes an arm 222 that facilitates attachment, removal and/or placement of the face seals. A carrier 224 of the stator assembly includes a carrier member 226 (which carries face seal 212) and a carrier member 228 (which carries face seal 214).

Hydrostatic face seal 214 includes a seal face 234, a seal dam 239, and an air bearing 243 that is fed via air passage 241 with air from the high-pressure side ($P_{HIGH}$) of the seal assembly 210. Air bearing air and leakage air passing air dam 239 will be discharged into a plenum 280 formed between hydrostatic face seal 214, hydrostatic face seal 212, rotor assembly 218, and carrier 224. Air pressure in plenum 280 will be at an intermediate pressure ($P_{INT}$) that is smaller than the high pressure side ($P_{HIGH}$) but larger than the low pressure side ($P_{LOW}$) of assembly 210. Hydrostatic face seal 212 includes a seal face 232, which incorporates a seal dam 233, and air bearing 237 that is fed via air passage 235 with air from the intermediate-pressure plenum 280. Air bearing air and leakage air passing air dam 233 will be discharged to the low pressure side ($P_{LOW}$) of assembly 210.

In operation, interaction between seal face 232 and seal runner face 242 results in hydrostatic forces urging seal face 232 away from seal runner face 242. Simultaneously, however, interaction between seal face 234 and seal runner face 244 results in other hydrostatic forces urging seal face 234 away from seal runner face 244. These competing hydrostatic forces can be balanced by compensating for the decrease in air bearing supply pressure from $P_{HIGH}$ at hydrostatic face seal 214 to $P_{INT}$ at hydrostatic face seal 212 with a corresponding increase in air bearing size from air bearing 243 to air bearing 237. centering of the seal runner between the opposing seal faces 242, 244, thereby establishing the desired sealing between the low-pressure side ($P_{LOW}$) and the high-pressure side ($P_{HIGH}$) of the seal assembly 210.

Carrier member 226 is axially translatable so that seal face 232 can move, with carrier member 226, away from or toward face 242 of seal runner 220. Similarly, carrier member 228 is axially translatable so that seal face 234 can move, with carrier member 228, away from or toward face 244 of seal runner 220.

An anti-rotation feature 246 is provided to prevent circumferential displacement of carrier member 226 with respect to the arm 222 and to assist in aligning the carrier member 226 to facilitate axial translation. An anti-rotation feature 248 is provided to prevent circumferential displacement of carrier member 228 with respect to carrier member 226.

A biasing member 250, biases the carrier members 226, 228 together to establish a defined clearance between the seal faces 232, 234. Additionally, a piston ring 252 is captured between opposing surfaces 254, 256 of the arm 222 and carrier member 226, respectively, to control gas leakage between the arm and the carrier.

Figure 5:
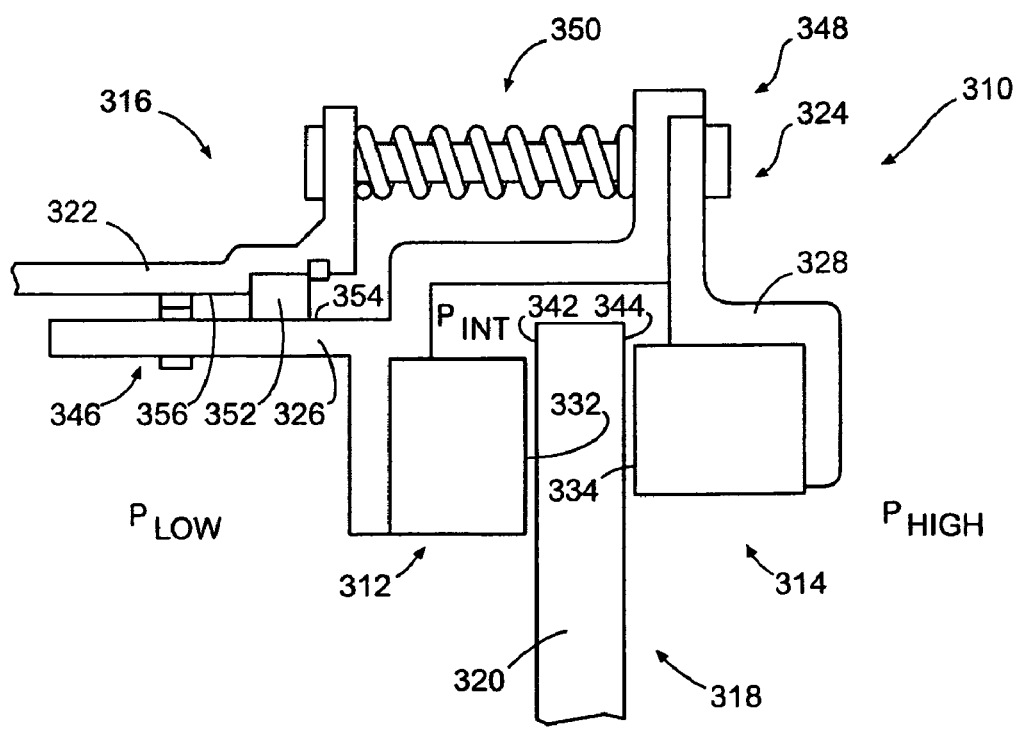
FIG. 5 is a schematic diagram depicting an exemplary embodiment of a self-balancing face seal using hydrodynamic balancing forces.

Another exemplary embodiment of a self-balancing face seal assembly is depicted schematically in FIG. 5. As shown in FIG. 5, face seal assembly 310 incorporates opposing hydrodynamic face seals 312 and 314 that are formed by portions of a stationary stator assembly 316 and a portion of a rotating rotor assembly 318. Specifically, rotor assembly 318 provides a seal runner 320.

Stator assembly 316 includes an arm 322 that facilitates attachment, removal and/or placement of the face seals. A carrier 324 of the stator assembly includes a carrier member 326 (which carries face seal 312) and a carrier member 328 (which carries face seal 314).

Hydrodynamic face seal 312 includes a seal face 332, and hydrodynamic face seal 314 includes a seal face 334. Carrier member 226 is axially translatable so that seal face 332 can move, with carrier member 326, away from or toward face 342 of seal runner 320. Similarly, carrier member 328 is axially translatable so that seal face 334 can move, with carrier member 328, away from or toward face 344 of seal runner 320. Notably, one or both of seal face 332 and seal runner face 342 can include surface features for generating hydrodynamic forces when the seal runner rotates relative to the seal face. Additionally, one or both of seal face 334 and seal runner face 344 can include surface features for generating hydrodynamic forces.

An anti-rotation feature 346 is provided to prevent circumferential displacement of carrier member 326 with respect to the arm 322 and to assist in aligning the carrier member 326 to facilitate axial translation. An anti-rotation feature 348 is provided to prevent circumferential displacement of carrier member 328 with respect to carrier member 326.

A biasing member 350, biases the carrier members 326, 328 to establish a defined clearance between the seal faces 332, 334. Additionally, a secondary seal 352 is positioned between opposing surfaces 354, 356 of the arm 322 and carrier member 326, respectively, to control gas leakage between the arm and the carrier.

In operation, interaction between seal face 332 and seal runner face 342 results in hydrodynamic forces urging seal face 332 away from seal runner face 342. Simultaneously, however, interaction between seal face 334 and seal runner face 344 results in other hydrodynamic forces urging seal face 334 away from seal runner face 344. These competing forces, when balanced, tend to cause centering of the seal runner between the opposing seal faces 342, 344, thereby establishing the desired sealing between the low-pressure side ($P_{LOW}$) and the high-pressure side ($P_{HIGH}$) of the seal assembly 310.

Notably, It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A self-balancing face seal assembly comprising:
a rotatable seal runner having a first seal runner face and an opposing second seal runner face;
a stator first face seal having a first seal face and operative to form a first seal with the first seal runner face, the first face seal being one of a hydrostatic seal and a hydrodynamic seal;
a stator second face seal having a second seal face and operative to form a second seal with the second seal runner face, the second face seal being one of a hydrostatic seal and a hydrodynamic seal;
a biasing member operative to space the first seal face from the second seal face at a defined clearance distance, wherein the bias member applies a bias force that acts in a substantially similar direction as one of a hydrostatic force and a hydrodynamic force during operation to maintain a desired separation between both the first seal face and first seal runner face and the second seal face and the second seal runner face; and
a carrier operative to movably position both the first face seal relative to the first seal runner face and the second face seal relative to the second seal runner face, and wherein the seal runner is positioned between the first seal face and the second seal face.

2. The assembly of claim 1, wherein:
the first face seal is annular; and
the second face seal is annular.

3. The assembly of claim 1, further comprising:
an arm, the carrier being attached to and movable relative to the arm; and
a secondary seal operative to reduce gas leakage between the arm and the carrier.

4. The assembly of claim 1, wherein the first face seal is a hydrostatic seal and the second face seal is a hydrostatic seal.

5. The assembly of claim 1, wherein the first face seal is a hydrodynamic seal and the second face seal is a hydrodynamic seal.

6. The assembly of claim 1, wherein at least one of the first seal face and the second seal face is formed of a material comprising carbon.

7. The assembly of claim 1, wherein:
the assembly further comprises a stator assembly and a rotor assembly,
each of the stator assembly and the rotor assembly being removable;
the stator assembly incorporating the first face seal and the second face seal;
the rotor assembly incorporating the seal runner.

8. The assembly of claim 1, wherein the biasing member biases both a first portion and a second portion of the carrier together to establish the defined clearance distance between the first face seal and the second face seal.

9. A turbine assembly for a gas turbine engine comprising:
a turbine having rotatable blades and a self-balancing face seal assembly;
the self-balancing face seal assembly having a rotatable seal runner, a stator first face seal and a stator second face seal;
the seal runner disposed between the first face seal and the second face seal and having a first seal runner face and a second seal runner face;
the first face seal having a first seal face and being operative to form a first seal with the first seal runner face, the first face seal being one of a hydrostatic seal and a hydrodynamic seal;

the second face seal having a second seal face and being operative to form a second seal with the second seal runner face, the second face seal being one of a hydrostatic seal and a hydrodynamic seal;

a biasing member operative to space the first seal face from the second seal face at a defined clearance distance, wherein the bias member applies a bias force that acts in a substantially similar direction as one of a hydrostatic force and a hydrodynamic force during operation to maintain a desired separation between both the first seal face and first seal runner face and the second seal face and the second seal runner face; and a carrier operative to movably position both the first face seal relative to the first seal runner face and the second face seal relative to the second seal runner face.

10. The assembly of claim 9, wherein both of the first face seal and the second face seal are hydrostatic face seals, or both of the first face seal and the second face seal are hydrodynamic face seals.

11. The assembly of claim 9, wherein the seal runner is operative to rotate with the rotatable blades.

12. The assembly of claim 9, wherein the turbine is a low-pressure turbine.

13. The assembly of claim 9, wherein the biasing member biases both a first portion and a second portion of the carrier together to establish the defined clearance distance between the first face seal and the second face seal.

14. A gas turbine engine comprising:
a compressor;
a shaft interconnected with the compressor; and
a turbine operative to drive the shaft, the turbine having a self-balancing face seal assembly having a rotatable seal runner, a stator first face seal and a stator second face seal;

the seal runner disposed between the first face seal and the second face seal and having a first seal runner face and a second seal runner face;

the first face seal having a first seal face and being operative to form a first seal with the first seal runner face, the first face seal being one of a hydrostatic seal and a hydrodynamic seal;

the second face seal having a second seal face and being operative to form a second seal with the second seal runner face, the second face seal being one of a hydrostatic seal and a hydrodynamic seal;

a biasing member operative to space the first seal face from the second seal face a defined clearance distance, wherein the bias member applies a bias force that acts in a substantially similar direction as one of a hydrostatic force and a hydrodynamic force during operation to maintain a desired separation between both the first seal face and first seal runner face and the second seal face and the second seal runner face; and a carrier operative to movably position both the first face seal relative to the first seal runner face and the second face seal relative to the second seal runner face.

15. The engine of claim 14, wherein both of the first face seal and the second face seal are hydrostatic face seals, or both of the first face seal and the second face seal are hydrodynamic face seals.

16. The engine of claim 14, wherein the engine is a gas turbine engine.

17. The engine of claim 16, wherein the gas turbine engine is a turbofan.

18. The engine of claim 14, wherein the biasing member biases both a first portion and a second portion of the carrier together to establish the defined clearance distance between the first face seal and the second face seal.

\* \* \* \* \*